United States Patent
Tableau et al.

(10) Patent No.: US 11,078,804 B2
(45) Date of Patent: Aug. 3, 2021

(54) TURBINE SHROUD ASSEMBLY

(71) Applicant: SAFRAN AIRCRAFT ENGINES, Paris (FR)

(72) Inventors: Nicolas Paul Tableau, Moissy-Cramayel (FR); Sébastien Serge Francis Congratel, Moissy-Cramayel (FR); Antoine Claude Michel Etienne Danis, Moissy-Cramayel (FR); Clément Jean Pierre Duffau, Moissy-Cramayel (FR); Clément Jarrossay, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/960,726

(22) PCT Filed: Dec. 24, 2018

(86) PCT No.: PCT/FR2018/053546
§ 371 (c)(1),
(2) Date: Jul. 8, 2020

(87) PCT Pub. No.: WO2019/138168
PCT Pub. Date: Jul. 18, 2019

(65) Prior Publication Data
US 2020/0355088 A1    Nov. 12, 2020

(30) Foreign Application Priority Data

Jan. 9, 2018  (FR) ...................................... 1850151

(51) Int. Cl.
F01D 11/08    (2006.01)
(52) U.S. Cl.
CPC .................................. F01D 11/08 (2013.01)

(58) Field of Classification Search
CPC .. F01D 11/08; F01D 25/246; F05D 2230/642; F05D 2240/11; F05D 2250/75;
(Continued)

(56) References Cited

U.S. PATENT DOCUMENTS 5,593,276 A     1/1997  Proctor et al.
10,030,541 B2 *  7/2018  Vetters .................. F01D 25/246
(Continued)

FOREIGN PATENT DOCUMENTS

EP     1 350 927 A2    10/2003
EP     3 118 417 A1    1/2017
(Continued)

OTHER PUBLICATIONS

International Search Report as issued in International Patent Application No. PCT/FR2018/053546, dated Apr. 15, 2019.

*Primary Examiner* — Igor Kershteyn
(74) *Attorney, Agent, or Firm* — Pillsbury Winthrop Shaw Pittman LLP

(57) ABSTRACT

A turbine ring assembly includes ring sectors forming a turbine ring and a ring support structure, each sector having, along a cutting plane defined by an axial direction and a radial direction of the ring, a portion forming an annular base with, in the radial direction, an inner face and an outer face from which a first and a second lug protrude, the structure including a shroud from which protrude a first and a second radial clamp from which the first and second lugs are held. The turbine ring includes an annular flange having a first portion bearing against the first lug, and a second portion removably fixed to the first radial clamp, the first portion including radial slits open on a free end of the annular flange and delimiting first-portion sectors.

11 Claims, 8 Drawing Sheets

(58) Field of Classification Search
CPC ........... F05D 2260/36; F05D 2260/941; F05D 2300/6033; F05D 2300/50212
See application file for complete search history.

(56) References Cited

U.S. PATENT DOCUMENTS

| | | | |
|---|---|---|---|
| 10,145,252 B2* | 12/2018 | Kirby | C04B 41/89 |
| 2012/0027572 A1 | 2/2012 | Denece et al. | |
| 2012/0082540 A1 | 4/2012 | Dziech et al. | |
| 2014/0271145 A1 | 9/2014 | Thomas et al. | |
| 2016/0251982 A1* | 9/2016 | Shapiro | F01D 25/246 |
| | | | 415/134 |
| 2017/0016341 A1* | 1/2017 | Stapleton | F01D 9/042 |
| 2020/0131938 A1* | 4/2020 | Tableau | F01D 11/005 |
| 2020/0355088 A1* | 11/2020 | Tableau | F01D 25/246 |
| 2021/0054757 A1* | 2/2021 | Tableau | F01D 11/005 |
| 2021/0108525 A1* | 4/2021 | Jarrossay | F01D 9/041 |
| 2021/0115806 A1* | 4/2021 | Tableau | F01D 11/08 |
| 2021/0172330 A1* | 6/2021 | Quennehen | F01D 25/246 |

FOREIGN PATENT DOCUMENTS

| | | |
|---|---|---|
| FR | 2 540 938 A1 | 8/1984 |
| FR | 2 540 939 A1 | 8/1984 |
| FR | 2 780 443 A1 | 12/1999 |
| FR | 2 955 898 A1 | 8/2011 |
| FR | 3 034 454 A1 | 10/2016 |
| GB | 2 480 766 A | 11/2011 |
| WO | WO 2006/136755 A2 | 12/2006 |
| WO | WO 2015/191169 A1 | 12/2015 |
| WO | WO 2015/191174 A1 | 12/2015 |
| WO | WO 2017/194860 A1 | 11/2017 |

\* cited by examiner

US 11,078,804 B2

TURBINE SHROUD ASSEMBLY

CROSS-REFERENCE TO RELATED APPLICATIONS

This application is the U.S. National Stage of PCT/FR2018/053546, filed Dec. 24, 2018, which in turn claims priority to French patent application number 1850151 filed Jan. 9, 2018. The content of these applications are incorporated herein by reference in their entireties.

BACKGROUND OF THE INVENTION

The invention relates to a turbine ring assembly comprising a plurality of ring sectors made of ceramic matrix composite material as well as a ring support structure.

The field of application of the invention is in particular that of aeronautical gas turbine engines. The invention is however applicable to other turbomachines, for example industrial turbines.

In the case of entirely metallic turbine ring assemblies, it is necessary to cool down all the elements of the assembly and particularly the turbine ring which is subjected to the hottest streams. This cooling has a significant impact on the performance of the engine since the cooling stream used is taken from the main stream of the engine. In addition, the use of metal for the turbine ring limits the possibilities of increasing the temperature at the turbine, which would however allow improving the performances of the aeronautical engines.

In order to try to solve these problems, it has been envisaged to produce turbine ring sectors made of ceramic matrix composite (CMC) material in order to dispense with the implementation of a metal material.

The CMC materials have good mechanical properties making them suitable for constituting structural elements and advantageously retain these properties at high temperatures. The implementation of CMC materials advantageously allowed reducing the cooling stream to be imposed during operation and therefore increasing the performance of the turbomachines. In addition, the implementation of CMC materials advantageously allows decreasing the mass of the turbomachines and reducing the effect of hot expansion encountered with the metal parts.

However, the existing solutions proposed can implement an assembly of a ring sector made of CMC with metal attachment portions of a ring support structure, these attachment portions being subjected to the hot stream. Consequently, these metal attachment portions undergo hot expansions, which can lead to a mechanical stressing of the ring sectors made of CMC and to their embrittlement.

The documents FR 2 540 939, GB 2 480 766, EP 1 350 927, US 2014/0271145, US 2012/082540 and FR 2 955 898 which disclose turbine ring assemblies are also known.

There is a need to improve the existing turbine ring assemblies and their mounting, and in particular the existing turbine ring assemblies implementing a CMC material in order to reduce the intensity of the mechanical stresses to which the ring sectors made of CMC are subjected during the operation of the turbine.

Document WO 2017/194860 discloses a turbine ring assembly as defined in the preamble of claim 1.

OBJECT AND SUMMARY OF THE INVENTION

The invention aims at proposing a turbine ring assembly allowing the holding of each ring sector in a deterministic manner, that is to say so as to control its position and prevent it from starting to vibrate, on the one hand, while allowing the ring sector, and by extension the ring, to deform under the effects of temperature rises and pressure variations, and this in particular independently of the metal parts at the interface and, on the other hand, while improving the sealing between the non-flowpath sector and the flowpath sector, in particular the sealing of the cavity located at the radially upper portion of the ring. All this by simplifying the handling and by reducing their number for the mounting the ring assembly.

The invention further aims at proposing a turbine ring assembly equipped with an upstream flange making it possible, on the one hand, to ensure the optimal sealing of the cavity defined by the ring and, on the other hand, to effectively accommodate the different axial lengths of each CMC ring sector that makes up the ring crown. In other words for this second point, the rectilinear contact between the upstream portion of the ring and the lug of the upstream flange must be effective for each ring sector, although these have different widths, these widths being indeed affected by the manufacturing tolerances.

An object of the invention proposes a turbine ring assembly comprising a plurality of ring sectors made of ceramic matrix composite material forming a turbine ring and a ring support structure, each ring sector having, according to a cutting plane defined by an axial direction and a radial direction of the turbine ring, a portion forming an annular base with, in the radial direction of the turbine ring, a radially inner face defining the inner face of the turbine ring and a radially outer face from which a first and a second attachment lug protrude, the ring support structure including a central shroud from which protrude a first and a second radial clamp from which the first and second attachment lugs of each ring sector are held.

According to a general characteristic of the object, the turbine ring assembly comprises a first annular flange disposed upstream of the turbine ring and of the first radial clamp relative to the direction of an air stream intended to pass through the turbine ring assembly. The first annular flange has a first free end, a second end opposite to the first end, a first portion extending from the first end, and a second portion extending between the first portion and the second end, the first portion of the first flange bearing against the first attachment lug of the turbine ring. The second portion of the first flange is fixed to the first radial clamp of the central shroud of the ring support structure, and the first portion of the first annular flange comprises a plurality of radial slits which lead to the first end of the first annular flange delimiting first-portion sectors of the first annular flange. Said first-portion sectors extend in a circumferential direction of the turbine ring.

Integrating a first fully sectorized upstream annular flange would allow each sector of the first sectorized upstream flange to adapt to the width of the facing ring made of CMC, that is to say to the axial length of each ring sector. Thus the axial leakage, in particular at the rectilinear bearings, between the ring and the first upstream flange is canceled. However, such a solution would cause significant leakage at the sectors between each sectorized flange. And this is the case even if devices such as sealing tabs are placed to mitigate this leakage towards the outer cavities of the ring.

Directly integrating a first annular flange in one piece, in other words a non-sectorized flange, would allow ensuring the axial sealing between the sectorized ring made of CMC and the annular casing, in particular by avoiding inter-sector leakage compared to a case where the first upstream flange is sectorized. However, the continuity of the first upstream annular flange, in particular at the rectilinear bearings facing the ring sectors that do not all have the same width (because of the manufacturing tolerances) would cause significant leakage at the rectilinear bearings. The first upstream annular flange would not accommodate well enough the ring sectors that have different widths.

The first portion of the first annular flange according to the invention thus allows, through its annular conformation without sectorization, ensuring the axial sealing between the sectorized turbine ring made of CMC and the annular casing. And the sectorization of the second portion of the first annular flange according to the invention allows accommodating each second-portion sector of the first annular flange with a facing turbine ring sector. In this manner, the leakage at the axial bearings of the turbine ring made of CMC is canceled.

The turbine ring assembly thus equipped with a first semi-sectorized annular flange therefore allows globally reducing the leakage between the cavity of the turbine ring and the outside.

Preferably, the second portion of the first flange is removably fixed to the first radial clamp of the central shroud of the ring support structure.

According to a first aspect of the turbine ring assembly, the first annular flange may comprise, for each radial slit, a discharge orifice, and each radial slit leads, on the one hand, to the first end of the first annular flange and, on the other hand, into the discharge orifice. In other words, each radial slit may comprise a first end open on the first end of the first annular flange and a second end opposite to said first end of the radial slit and open on the discharge orifice.

The transition between the second sectorized portion and the first annular portion of the first flange is hereinafter called slot bottom. The slot bottom constitutes the seat of tangential stress concentrations when the first semi-sectorized annular flange is subjected to a radial temperature gradient. These tangential stress concentrations at the bottom of the slot can initiate cracks and thus reduce the service life of the first annular flange.

The discharge orifices allow significantly reducing the stress concentrations by diffusing the stresses around the discharge orifice.

According to a second aspect of the turbine assembly, the discharge orifices can be circular orifices having a diameter comprised between 0.1 mm and 8 mm and preferably between 1 mm and 5 mm. The diameter of the circular discharge orifice plays a key role in reducing the stresses, as shown in the graph in FIG. 1 representing the change in the stress rate as a function of the diameter of the discharge orifice, the rate being determined with respect to a first upstream annular flange without discharge orifice. On this graph, it can be seen that the addition of a discharge hole up to a diameter of 5 mm allows lowering the maximum stress level by 62%. The addition of these discharge orifices therefore allows ensuring the structural integrity of the first annular flange when it is subjected to a radial temperature gradient.

In one variant, the discharge orifices may be oblong radial orifices, that is to say orifices having an oblong shape with a length extending in the radial direction and a width in a direction orthogonal to the radial direction, the length being greater than the width of the oblong orifice.

In another variant, the discharge orifices can be tangential oblong orifices, that is to say orifices having an oblong shape with a width extending in the radial direction and a length in a direction orthogonal to the radial direction, in other words a width extending in a tangential direction, the length being greater than the width of the oblong orifice.

According to a third aspect of the turbine assembly, the turbine ring assembly further comprises an inter-sector seal for each radial slit of the first annular flange, each radial slit having a first and a second surface parallel to each other in the radial direction and in the axial direction, the first surface comprising a first groove and the second surface comprising a second groove extending opposite the first groove symmetrically to the first groove relative to a plane extending in the axial direction and in the radial direction along the radial slit.

The inter-sector seals, or sealing tabs, inserted in the radial slits allow reducing leakage at the cavity of the ring.

According to a fourth aspect of the turbine ring assembly, the ring assembly further comprises a second annular flange disposed upstream of the first annular flange relative to the direction of the air stream intended to pass through the turbine ring assembly, the second annular flange having a first free end and a second end opposite to the first end, the first end of the second annular flange being distant from the first end of the first annular flange in the axial direction, the second ends of the first and second annular flanges being removably fixed to the first radial clamp of the central shroud of the ring support structure.

The second annular flange separated from the first annular flange at its free end allows providing the turbine ring assembly with an upstream flange dedicated to taking up the force of the high-pressure distributor (HPD). The second annular flange upstream of the turbine ring and free from any contact with the ring is configured to transfer the maximum axial force induced by the HPD directly into the ring support structure without passing through the ring which has, when made of CMC, a low mechanical allowability.

Indeed, leaving a space between the first ends of the first and second annular flanges allows deflecting the force received by the second flange, upstream of the first annular flange which is in contact with the turbine ring, and transferring it directly towards the central shroud of the ring support structure via the second end of the second annular flange, without affecting the first annular flange and therefore without affecting the turbine ring. The first end of the first flange does not undergo any force, the turbine ring is thus preserved from this axial force.

The transfer of HPD force via the second annular flange can induce its tilting. This tilting can cause uncontrolled contact between the low portions, that is to say the first ends, of the second annular flange and of the first annular flange in contact with the turbine ring, which would have the consequence of directly transmitting the HPD force to the ring.

In one variant, the second end of the first flange and the second end of the second flange can be separated by a contact stop. The contact stop provided between the second ends of the first and second annular flanges allows avoiding the contact between the low portion of the second annular flange, disposed upstream of the first flange, and that of the first annular flange, following this tilting. The direct transfer of the HPD force towards the ring is therefore avoided.

In addition, the removable nature of the annular flanges allows having axial access to the cavity of the turbine ring. This allows assembling the ring sectors together outside of the ring support structure and then axially sliding the assembly thus assembled into the cavity of the ring support structure until it bears against the second radial clamp, before fixing the annular flange on the central shroud of the ring support structure.

During the operation of fixing the turbine ring to the support structure of the ring, it is possible to use a tool including a cylinder or a ring on which the ring sectors are pressed or suctioned during their crown assembly.

The solution defined above for the ring assembly thus allows holding each ring sector in a deterministic manner, that is to say controlling its position and preventing it from vibrating, while by improving the sealing between the non-flowpath sector and the flowpath sector, by simplifying the handling and reducing their number for the mounting of the ring assembly, and by allowing the ring to deform under the effect of temperature and pressure, in particular independently of the metal parts at the interface.

According to a fifth aspect of the turbine ring assembly, the first flange may have a thickness in the axial direction smaller than the thickness in the axial direction of the second flange.

The fineness of the second end of the first annular flange provides flexibility to the upstream portion of the support structure intended to be in contact with the ring.

According to a sixth aspect of the turbine ring assembly, the second radial clamp of the ring support structure has a first free end and a second end secured to the central shroud of the ring support structure, the first end of the second radial clamp being in contact with the second attachment lug of the turbine ring and having a thickness in the axial direction greater than the thickness of the first end of the first annular flange.

Controlling the rigidity at the axial contacts of the ring support structure with the ring ensures holding the sealing in all circumstances, without inducing excessive axial forces on the ring. The increased thickness of the downstream portion of the ring support structure, particularly of the first end of the second radial clamp, the free end, allows offering greater rigidity to the downstream portion of the ring support structure relative to its upstream portion comprising the first annular radial clamp and the first and second annular flanges. This increased rigidity allows reducing the downstream axial leakage between the ring and the casing, that is to say the ring support structure, in the case of a rectilinear bearing.

According to a seventh aspect of the turbine ring assembly, the ring sector may have a section in inverted Greek letter pi (π) according to the cutting plane defined by the axial direction and the radial direction, and the assembly may comprise, for each ring sector, at least three pins for radially holding the ring sector in position, the first and second attachment lugs of each ring sector each comprising a first end secured to the outer face of the annular base, a second free end, at least three ears for receiving said at least three pins, at least two ears protruding from the second end of one of the first or second attachment lugs in the radial direction of the turbine ring and at least one ear protruding from the second end of the other attachment lug in the radial direction of the turbine ring, each receiving ear including an orifice for receiving one of the pins.

According to an eighth aspect of the turbine ring assembly, the ring sector may have a section with an elongated K shape along the cutting plane defined by the axial direction and the radial direction, the first and second attachment lugs having an S shape.

According to a ninth aspect of the turbine ring assembly, the ring sector may have, over at least one radial range of the ring sector, an O-section along the cutting plane defined by the axial direction and the radial direction, the first and second attachment lugs each having a first end secured to the outer face and a second free end, and each ring sector comprising a third and a fourth attachment lug each extending, in the axial direction of the turbine ring, between a second end of the first attachment lug and a second end of the second attachment lug, each ring sector being fixed to the ring support structure by a fixing screw including a screw head bearing against the ring support structure and a thread cooperating with a tapping made in a fixing plate, the fixing plate cooperating with the third and fourth attachment lugs. The ring sector further comprises radial pins extending between the central shroud and the third and fourth attachment lugs.

Another object of the invention proposes a turbomachine comprising a turbine ring assembly as defined above.

BRIEF DESCRIPTION OF THE DRAWINGS

The invention will be better understood upon reading the following, for indication but without limitation, with reference to the appended drawings, wherein.

DETAILED DESCRIPTION OF EMBODIMENTS

Figure 2:
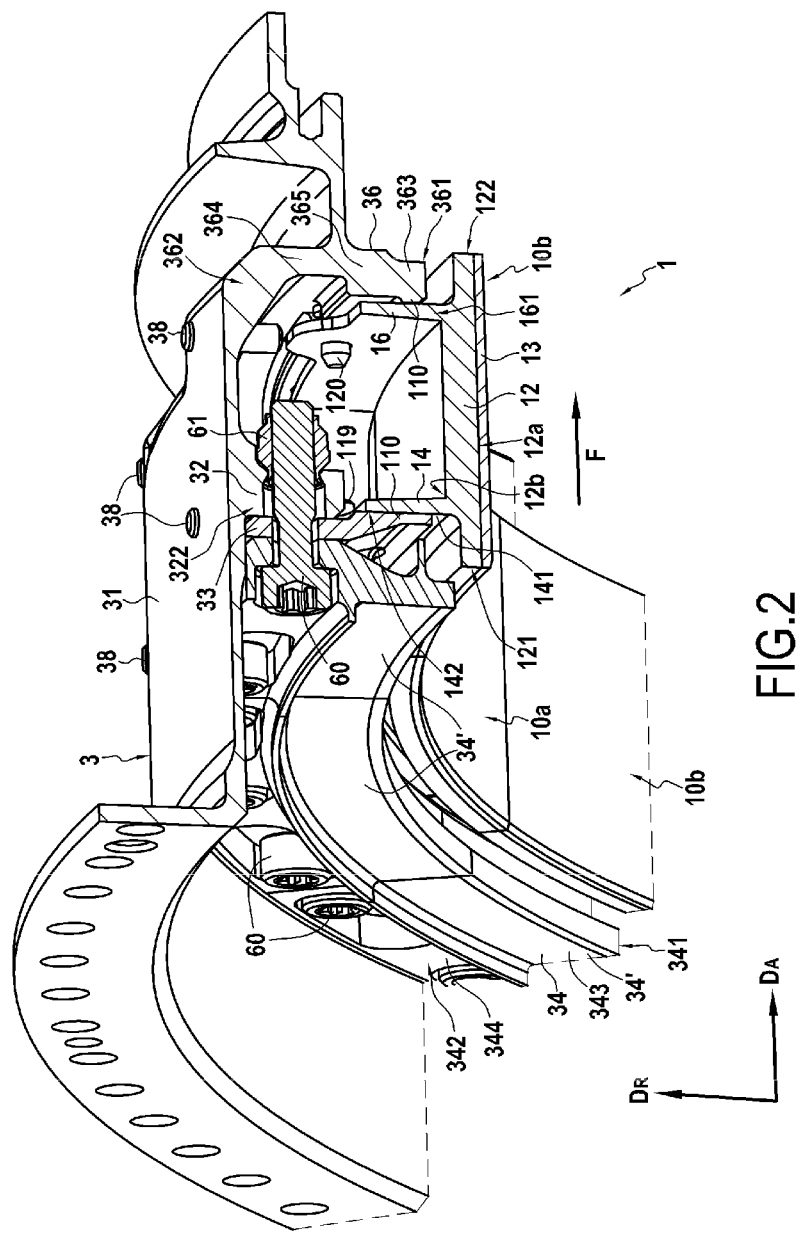
FIG. 2 is a schematic perspective view of a first embodiment of a turbine ring assembly according to the invention.

FIG. 2 shows a high-pressure turbine ring assembly comprising a turbine ring 1 made of ceramic matrix composite (CMC) material and a metal ring support structure 3. The turbine ring 1 surrounds a set of rotary blades (not represented). The turbine ring 1 is formed of a plurality of ring sectors 10, FIG. 2 being a view in radial section. The arrow $D_A$ indicates the axial direction of the turbine ring 1 while the arrow $D_R$ indicates the radial direction of the turbine ring 1. For reasons of simplification of presentation, FIG. 2 is a partial view of the turbine ring 1 which is actually a complete ring.

Figure 3:
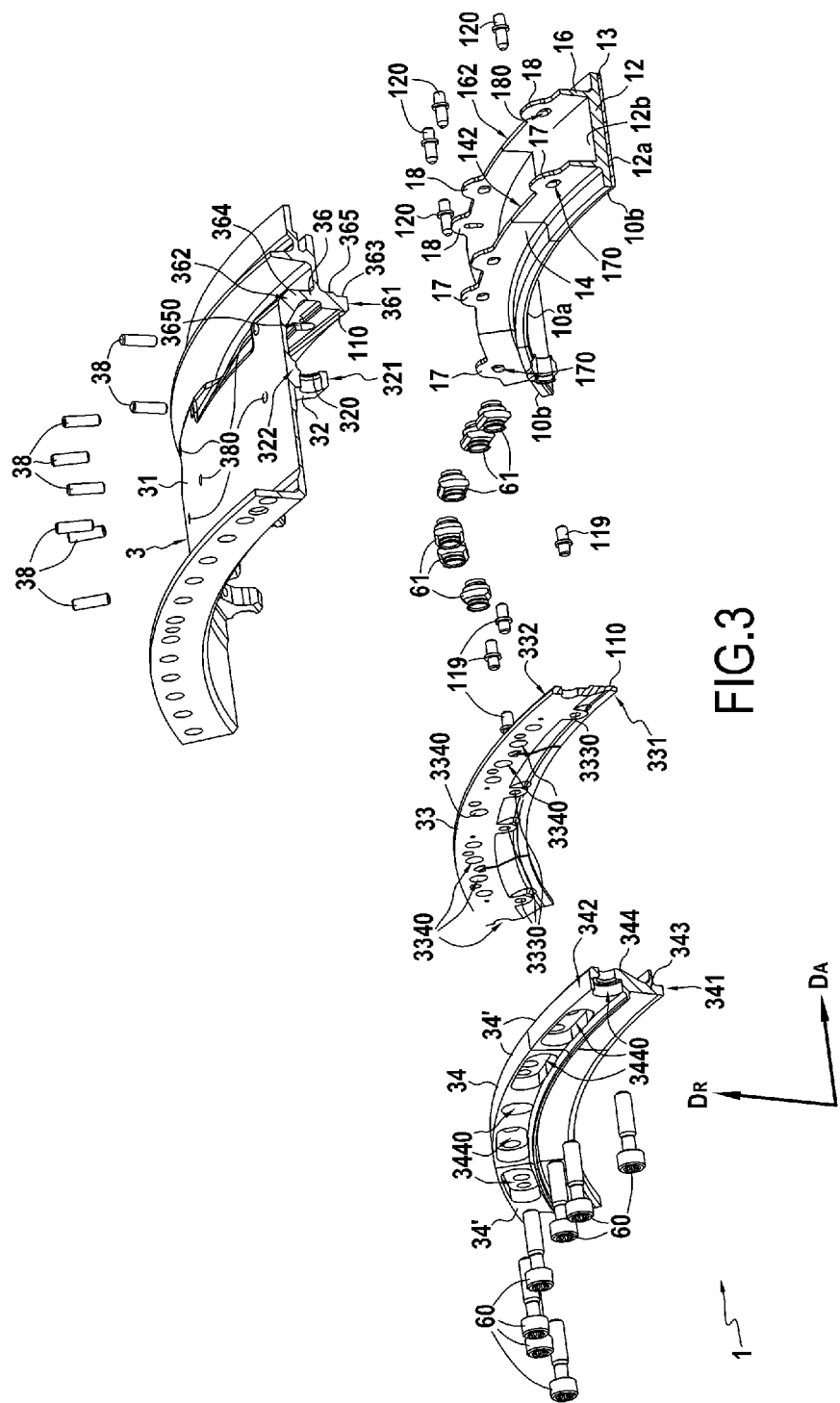
FIG. 3 is a schematic exploded perspective view of the turbine ring assembly of FIG. 2.
Figure 4:
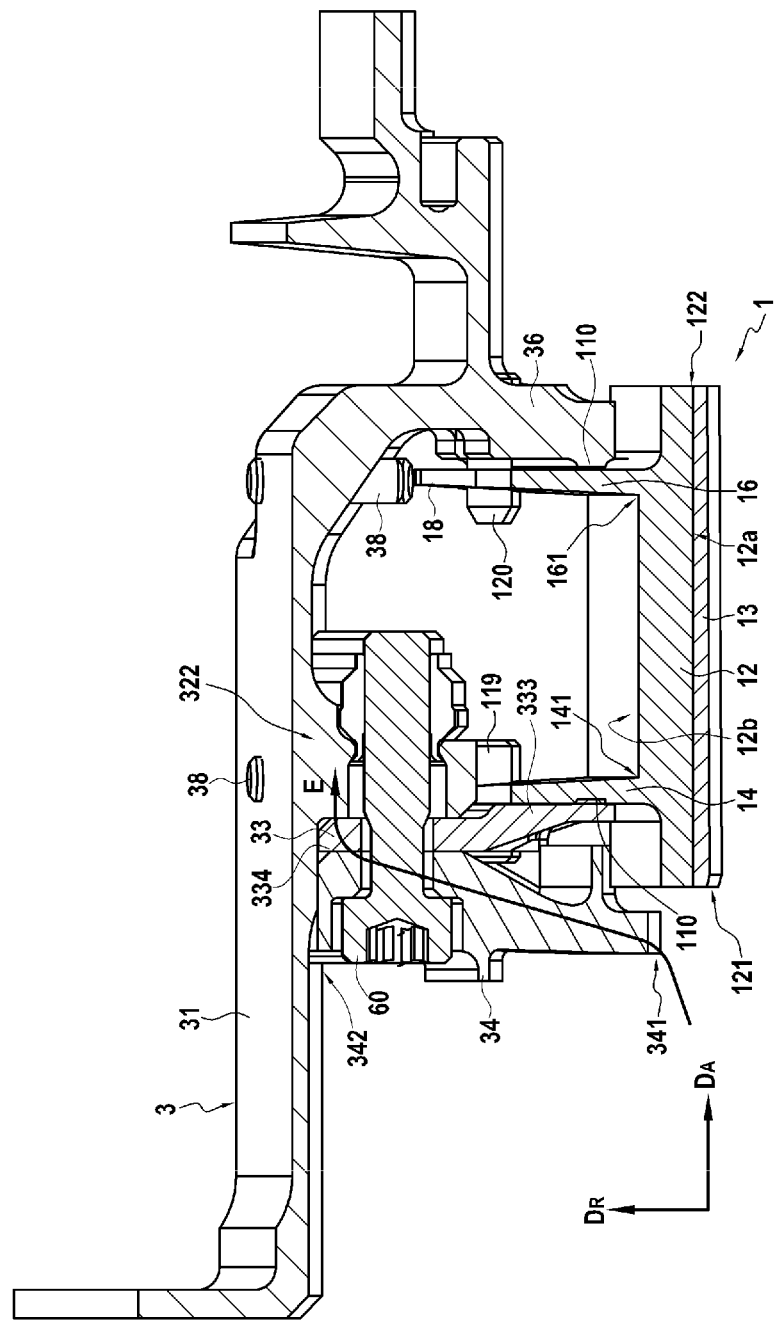
FIG. 4 is a schematic sectional view of the turbine ring assembly of FIG. 2.

As illustrated in FIGS. 3 and 4 which respectively present a schematic exploded perspective view and a sectional view of the turbine ring assembly of FIG. 2, the sectional view being along a cutting plane comprising the radial direction $D_R$ and the axial direction $D_A$, each ring sector 10 has, along a plane defined by the axial $D_A$ and radial $D_R$ directions, a section substantially in the shape of the inverted Greek letter π. The section indeed comprises an annular base 12 and upstream and downstream radial attachment lugs, respectively 14 and 16. The terms "upstream" and "downstream" are used here with reference to the direction of flow of the gas stream in the turbine represented by the arrow F in FIG. 1. The lugs of the ring sector 10 could have another shape, the section of the ring sector having a shape other than it, such as for example a K or an O shape.

The annular base 12 includes, along the radial direction $D_R$ of the ring 1, an inner face 12a and an outer face 12b opposite to each other. The inner face 12a of the annular base 12 is coated with a layer 13 made of abradable material to define a flowpath for flowing the gas stream in the turbine. The terms "inner" and "outer" are used here with reference to the radial direction $D_R$ in the turbine.

The upstream and downstream radial attachment lugs 14 and 16 protrude, along the direction $D_R$, from the outer face 12b of the annular base 12 at a distance from the upstream and downstream ends 121 and 122 of the annular base 12. The upstream and downstream radial attachment lugs 14 and 16 extend over the entire width of the ring sector 10, that is to say over the entire arc of a circle described by the ring sector 10, or even over the entire circumferential length of the ring sector 10.

In FIGS. 2 and 3, the turbine ring portion 1 represented comprises a complete ring sector 10 surrounded by two half ring sectors 10. For a better understanding, the complete ring sector is referenced 10a and the half ring sectors are referenced 10b in FIG. 3.

As illustrated in FIGS. 2 to 4, the ring support structure 3 which is secured to a turbine casing comprises a central shroud 31, extending in the axial direction $D_A$, and having an axis of revolution coincident with the axis of revolution of the turbine ring 1 when they are fixed together, as well as a first annular radial clamp 32 and a second annular radial clamp 36, the first annular radial clamp 32 being positioned upstream of the second annular radial clamp 36 which is therefore downstream of the first annular radial clamp 32.

The second annular radial clamp 36 extends in the circumferential direction of the ring 1 and, along the radial direction $D_R$, from the central shroud 31 towards the center of the ring 1. It comprises a first free end 361 and a second end 362 secured to the central shroud 31. The second annular radial clamp 36 includes a first portion 363, a second portion 364, and a third portion 365 comprised between the first portion 363 and the second portion 364. The first portion 363 extends between the first end 361 and the third portion 365, and the second portion 364 extends between the third portion 365 and the second end 362. The first portion 363 of the second annular radial clamp 36 is in contact with the downstream radial attachment clamp 16. The first portion 363 and the third portion 365 have an increased thickness compared to that of the second portion 364 to provide increased rigidity to the second radial clamp relative to the upstream portion including in particular the first radial clamp 32, so as to reduce the axial leakage of the ring in the case of a rectilinear bearing.

The first annular radial clamp 32 extends in the circumferential direction of the ring 1 and, along the radial direction $D_R$, from the central shroud 31 towards the center of the ring 1. It comprises a first free end 321 and a second end 322 secured to the central shroud 31.

Figure 1:
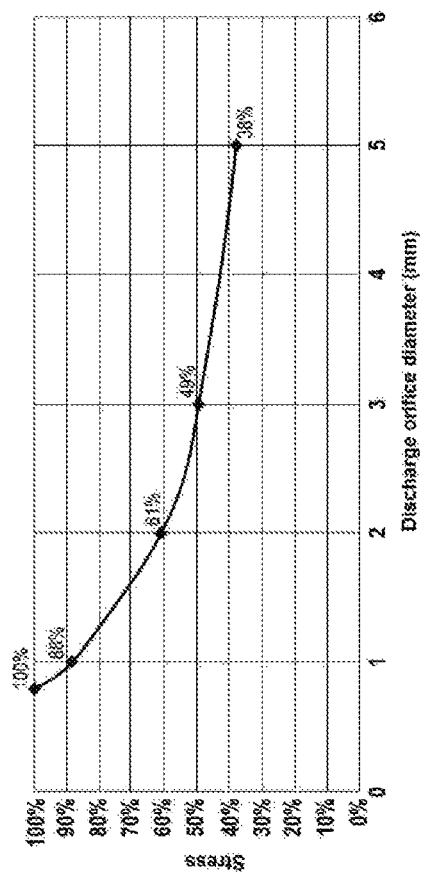
FIG. 1, already presented, presents a graph of the change of the maximum stress exerted on the first annular flange as a function of the diameter of the discharge orifice.

As illustrated in FIGS. 1 to 3, the turbine ring assembly 1 comprises a first annular flange 33 and a second annular flange 34, the two annular flanges 33 and 34 being removably fixed on the first annular radial clamp 32. The first and second annular flanges 33 and 34 are disposed upstream of the turbine ring 1 relative to the direction F of flow of the gas stream in the turbine.

The first annular flange 33 is disposed downstream of the second annular flange 34. The first annular flange 33 is in one piece while the second annular flange 34 can be sectorized into a plurality of annular sectors of the second flange 34 or be in one piece.

The first annular flange 33 has a first free end 331 and a second end 332 removably fixed to the ring support structure 3, and more particularly to the first annular radial clamp 32. In addition, the first annular flange 33 has a first portion 333 and a second portion 334, the first portion 333 extending between the first end 331 and the second portion 334, and the second portion 334 extending between the first portion 333 and the second end 332.

The second annular flange 34 has a first free end 341 and a second end 342 opposite to the first end 341 and in contact with the central crown 31. The second end 342 of the second annular flange 34 is also removably fixed to the ring support structure 3, and more particularly to the first annular radial clamp 32. The second annular flange 34 further comprises a first portion 343 and a second portion 344, the first portion 343 extending between the first end 341 and the second portion 344, and the second portion 344 extending between the first portion 343 and the second end 342.

When the ring assembly 1 is mounted, the first portion 333 of the first annular flange 33 is bearing against the upstream radial attachment lug 14 of each of the ring sectors 10 making up the turbine ring 1, and the second portion 334 of the first annular flange 34 is bearing against at least part of the first annular radial clamp 32.

The first and second upstream annular flanges 33 and 34 are shaped to have the first portions 333 and 343 distant from each other and the second portions 334 and 344 in contact with each other, the two flanges 33 and 34 being removably fixed on the upstream annular radial clamp 32 using fixing screws 60 and nuts 61, the screws 60 passing through orifices 3340, 3440 and 320 provided respectively in the second portions 334 and 344 of the two upstream flanges 33 and 34 as well as in the upstream annular radial clamp 32.

The second annular flange 34 is dedicated to taking up the force of the high-pressure distributor (HPD) on the ring assembly 1 by transferring this force towards the casing line which is more robust mechanically, that is to say towards the line of the ring support structure 3 as illustrated by the force arrows E presented in FIG. 4. The residual force, which passes through the first upstream flange 33 is reduced since the first portion 333 of the first upstream flange 33 has a reduced section, and is therefore more flexible, which allows applying a minimum of force to the CMC ring 1.

In the axial direction $D_A$, the downstream annular radial clamp 36 of the ring support structure 3 is separated from the first upstream annular flange 33 by a distance corresponding to the spacing of the upstream and downstream radial attachment lugs 14 and 16 so as to hold them between the downstream annular radial clamp 36 and the first upstream flange 33.

To hold the ring sectors 10, and therefore the turbine ring 1, in position with the ring support structure 3, the ring assembly comprises, for each ring sector 10, two first pins 119 cooperating with the upstream attachment lug 14 and the first annular flange 33, and two second pins 120 cooperating with the downstream attachment lug 16 and the second annular radial clamp 36.

For each corresponding ring sector 10, the first portion 333 of the first annular flange 33 comprises two orifices 3330 for receiving the two first pins 119, and the third portion 365 of the annular radial clamp 36 comprises two orifices 3650 configured to receive the two second pins 120.

For each ring sector 10, each of the upstream and downstream radial attachment lugs 14 and 16 comprises a first end, 141 and 161, secured to the outer face 12b of the annular base 12 and a second free end, 142 and 162. The second end 142 of the upstream radial attachment lug 14 comprises two first ears 17 each including an orifice 170 configured to receive a first pin 119. Similarly, the second end 162 of the downstream radial attachment lug 16 comprises two second ears 18 each including an orifice 180 configured to receive a second pin 120. The first and second ears 17 and 18 protrude in the radial direction $D_R$ of the turbine ring 1 respectively from the second end 142 of the upstream radial attachment lug 14 and from the second end 162 of the downstream radial attachment lug 16.

The orifices 170 and 180 can be circular or oblong. Preferably, the set of the orifices 170 and 180 comprises a portion of circular orifices and a portion of oblong orifices. The circular orifices allow indexing tangentially the rings and preventing them from being able to move tangentially (in particular in the case of a touch by the vane). The oblong orifices allow accommodating the differential expansions between the CMC and the metal. The CMC has a coefficient of expansion much lower than that of the metal. When hot, the lengths in the tangential direction of the ring sector and of the facing casing portion will therefore be different. If there were only circular orifices, the metal casing would impose its displacements on the ring made of CMC, which would be a source of very high mechanical stresses in the ring sector. Having oblong holes in the ring assembly allows the pin to slide in this hole and avoid the over-stress phenomenon mentioned above. Therefore, two drilling patterns can be imagined: a first drilling pattern, for a case with three ears, would comprise a circular orifice on a radial attachment clamp and two tangential oblong orifices on the other radial attachment clamp, and a second drilling pattern, for a case with at least four ears, would comprise a circular orifice and an oblong orifice per facing radial attachment clamp every time. Other ancillary cases can also be considered.

For each ring sector 10, the first two ears 17 are positioned at two different angular positions relative to the axis of revolution of the turbine ring 1. Similarly, for each ring sector 10, the two seconds ears 18 are positioned at two different angular positions relative to the axis of revolution of the turbine ring 1.

Each ring sector 10 further comprises rectilinear bearing surfaces 110 mounted on the faces of the first annular flange 33 and of the second annular radial clamp 36 in contact respectively with the upstream radial attachment lug 14 and the downstream radial attachment lug 16, that is to say on the downstream face of the first annular flange 33 and on the upstream face of the second annular radial clamp 36.

The rectilinear bearings 110 are located under the orifices 3330 for receiving the two first pins 119, that is to say inside the orifices 3330 along the radial direction.

In one variant, the rectilinear bearings could be mounted on the faces of the upstream and downstream radial attachment lugs 14 and 16 in contact respectively with the first upstream annular flange 33 and the downstream annular radial clamp 36.

The rectilinear bearings 110 allow having controlled sealing areas. Indeed, the bearing surfaces 110 between the first upstream annular flange 33 and the upstream radial attachment lug 14 on the one hand, and between the downstream annular radial clamp 36 and the downstream radial attachment lug 16 on the other hand, are comprised in the same rectilinear plane.

More specifically, having bearings on radial planes allows overcoming the effects of axial tilting of the turbine ring 1. Indeed, during the tilting of the operating ring, the rectilinear bearing allows preserving a complete sealing line.

The radial holding of the ring 1 is ensured by the first annular flange 33 which is pressed on the first annular radial clamp 32 of the ring support structure 3 and on the upstream radial attachment lug 14. The first annular flange 33 ensures the sealing between the flowpath cavity and the non-flowpath cavity of the ring.

The second annular flange 34 ensures the connection between the downstream portion of the HPD, the ring support structure 3, or casing, by radial surface contact, and the first annular flange 33 by axial surface contact.

The ring support structure 3 further comprises radial pins 38 which allow pressing the ring in the low radial position, that is to say towards the flowpath, in a deterministic manner. There is indeed a clearance between the axial pins and the bores on the ring to compensate for the differential expansion between the metal and the elements made of CMC which takes place in a hot mode. The radial pins 38 cooperate with orifices 380 made along the radial direction $D_R$ in the central crown 31 of the ring support structure 3.

Figure 5A:
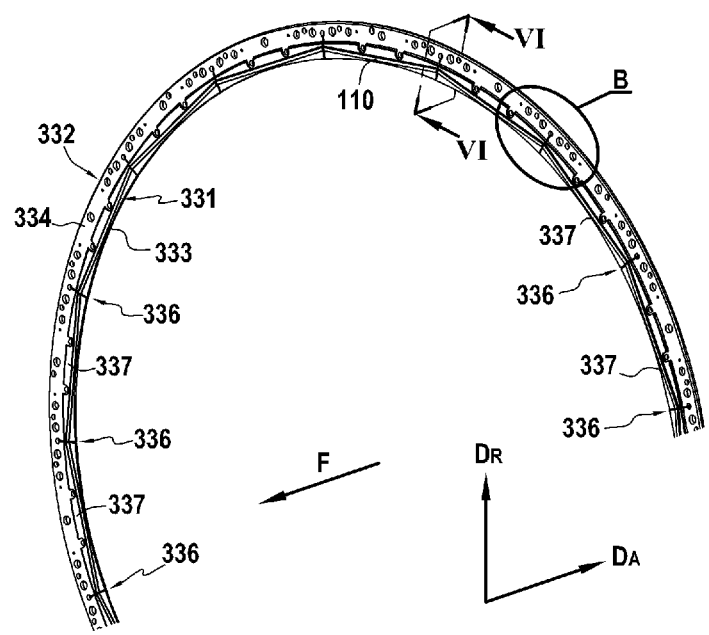
FIGS. 5A and 5B are respectively a partial schematic perspective view of the first upstream annular flange of FIG. 2 and a zoom of a portion of the first upstream annular flange.

FIGS. 5A and 58 respectively illustrate a partial schematic perspective view of the first upstream annular flange 33 of FIG. 2 and a zoom of a portion of the first upstream annular flange 33.

Figure 5B:
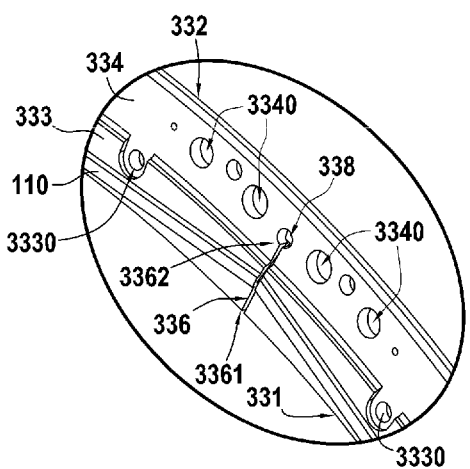

As illustrated in FIGS. 5A and 5B, the first portion 333 of the first annular flange 33 has a plurality of radial slits 336 extending from the first end 331. The radial slits 336 have a first end 3361 and a second end 3362 opposite to the first end 3361, the first end 3361 being inside the second end 3362 in the radial direction $D_R$. The first ends 3361 of the radial slits 36 are open on the first end 331 of the first annular flange 33. Each radial slit 336 has a first and a second surface 3364 parallel to each other in the radial direction $D_R$ and in the axial direction $D_A$, the distance between the first and the second surface 3364, which corresponds to the tangential thickness of the slots, can be comprised between 0.1 mm and 1 mm. The radial length of the slits can be comprised between 10 and 90% of the full radial length of the upstream flange. A short radial slit length promotes the reduction of leakage, but degrades the capacity of accommodation of the sectors of the flange with respect to the ring sectors. A high radial slit length promotes the accommodation of the sectors of the flange with respect to the ring sectors but increases the level of leakage.

Each pair of adjacent radial slits 336 thus delimits, between the two adjacent radial slits 336, a first-portion sector 337 of the first annular flange 33. Each first-portion sector 337 has a shape of ring sector, that is to say a solid formed by two arcs of concentric circles and with different radii and two segments of straight lines each corresponding to a segment of the radius of the large arc of circle comprised between the small arc of circle and the large arc of circle. Each first-portion sector 337 is independent of the other first-portion sectors 337 since the radial slits 36 are open on their first end 3361.

The first annular flange 33 further comprises discharge orifices 338, and more particularly a discharge orifice 338 per radial slit 336. Each discharge orifice 338 communicates with the second end 3362 of a radial slit 36. In other words, each discharge orifice 338 is produced in the first annular flange 33 at the second end 3362 of a radial slit so that the second end 3362 of a radial slit is open on the corresponding discharge orifice 338.

In the first embodiment illustrated in FIGS. 2 to 5B, the discharge orifices 338 are circular orifices having a diameter comprised between 1 mm and 5 mm.

Figure 6:
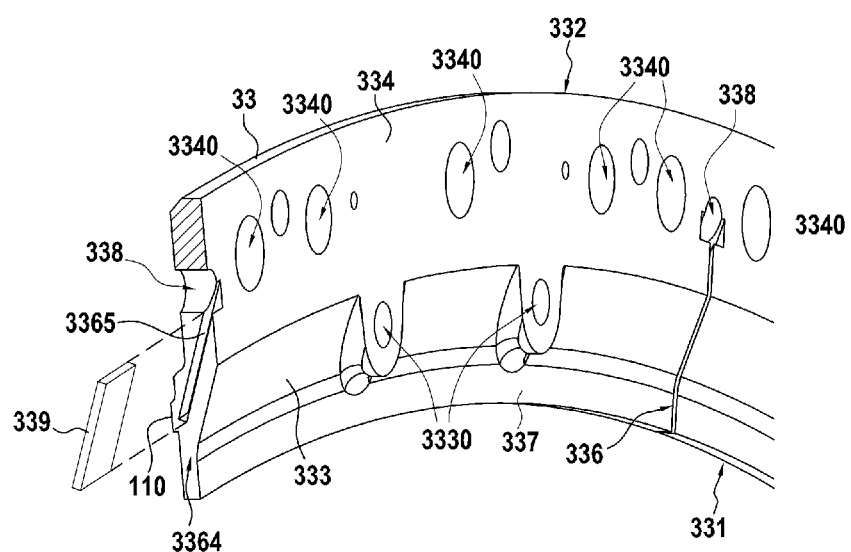
FIG. 6 is a schematic sectional view of the first upstream annular flange of FIG. 5A according to the cutting plane VI-VI.

FIG. 6 illustrates a schematic sectional view of the first upstream annular flange of FIG. 5A along the cutting plane VI-VI.

The cutting plane VI-VI comprises the radial direction $D_R$ and the axial direction $D_A$ and passes through a radial slit 336 of the first annular flange 33.

As illustrated in FIG. 6, the first annular flange 33 comprises an inter-sector seal 339 for each radial slit 336.

Each radial slit 336 has a first and a second surface 3364 on either side of the radial slit 336. FIG. 6 being a section made through a radial slit 336, only a radial slit 336 surface 3364 is represented. The first and second surfaces 3364 of a radial slit 336 are parallel to each other, that is to say they are disposed opposite each other over the entire radial length of the radial slit 336.

The first surface 3364 comprises a first groove 3365 extending mainly in the radial direction $D_R$. Likewise, the second surface comprises a second groove extending mainly in the radial direction $D_R$. The second groove extends opposite the first groove 3365 symmetrically to the first groove 3365 relative to the cutting plane VI-VI.

The first and second grooves 3365 of a radial slit 336 are shaped to receive the inter-sector seal 339, or sealing strip. The inter-sector seal thus allows ensuring a sealing between the first-portion sectors 333 of the first annular flange 33.

Figure 7:
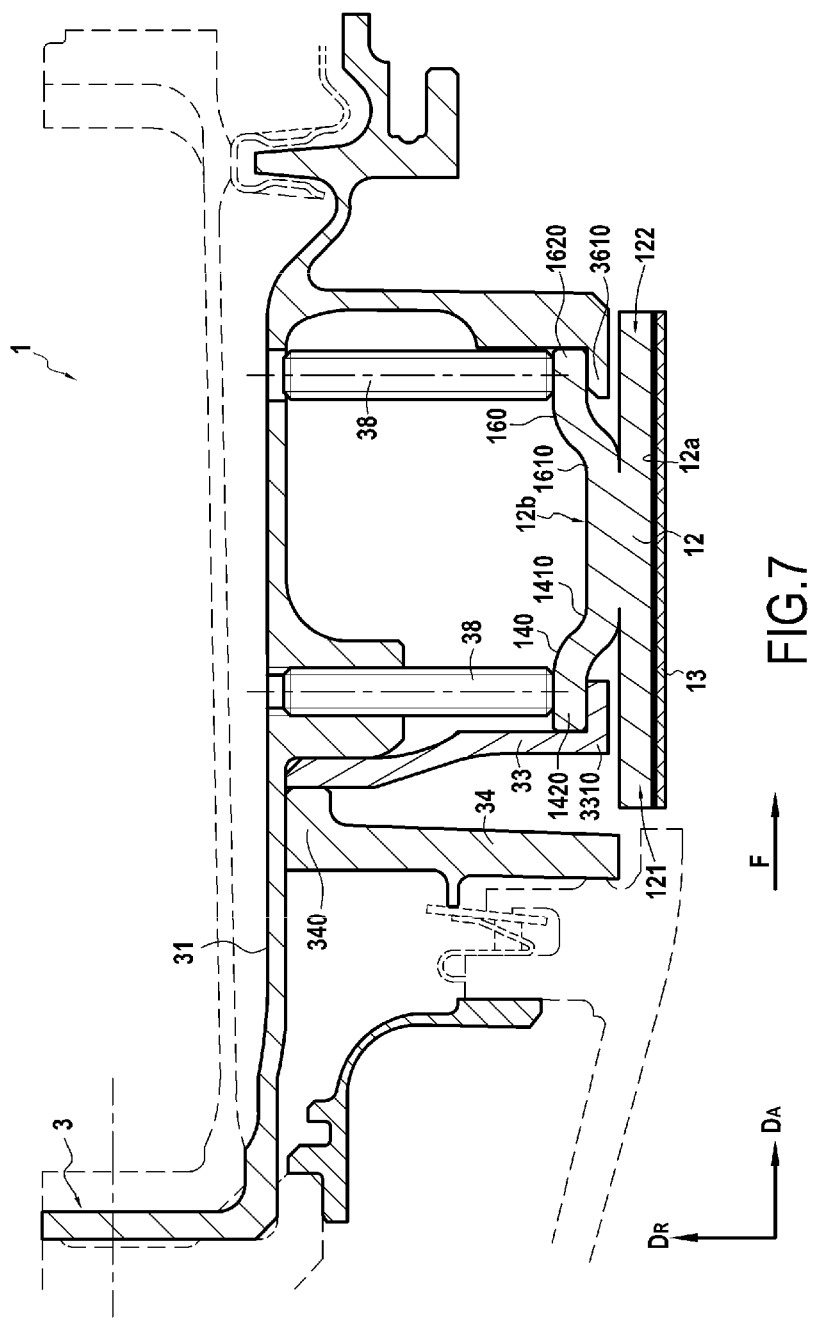
FIG. 7 is a schematic sectional view of a second embodiment of the turbine ring assembly.

FIG. 7 presents a schematic sectional view of a second embodiment of the turbine ring assembly.

The second embodiment illustrated in FIG. 7 differs from the first embodiment illustrated in FIGS. 2 to 6 in that the ring sector 10 has, in the plane defined by the axial $D_A$ and radial $D_R$ directions, a K-shaped section comprising an annular base 12 with, along the radial direction $D_R$ of the ring, an inner face 12a coated with a layer 13 made of abradable material forming a thermal and environmental barrier and which defines the flowpath for flowing the gas stream in the turbine. Substantially S-shaped upstream and downstream radial attachment lugs 140, 160 extend, along the radial direction $D_R$, from the outer face 12b of the annular base 12 over the entire width thereof and above the upstream and downstream circumferential end portions 121 and 122 of the annular base 12.

The radial attachment lugs 140 and 160 have a first end, referenced respectively 1410 and 1610, secured to the annular base 12 and a second free end, referenced respectively 1420 and 1620. The free ends 1420 and 1620 of the upstream and downstream radial attachment lugs 140 and 160 extend either parallel to the plane in which the annular base 12 extends, that is to say along a circular plane, or in a rectilinear manner while the attachment lugs 140 and 160 extend annularly. In this second configuration where the ends are rectilinear and the attachment lugs are annular, in the event of a possible tilting of the ring during operation, the surface bearings then become linear bearings which offers a greater sealing than in the case of point bearings. The second end 1620 of the downstream radial attachment lug 160 is held between a portion 3610 of the second annular radial clamp 36 protruding in the axial direction $D_A$ from the first end 361 of the second annular radial clamp 36 in the direction opposite to the direction of the stream F and the free end of the associated screw 38, that is to say the screw opposite to the screw head. The second end 1410 of the upstream radial attachment lug 140 is held between a portion 3310 of the first annular flange 33 protruding in the axial direction $D_A$ from the first end 331 of the first annular flange 33 in the direction of the stream F and the free end of the associated screw 38.

Figure 8:
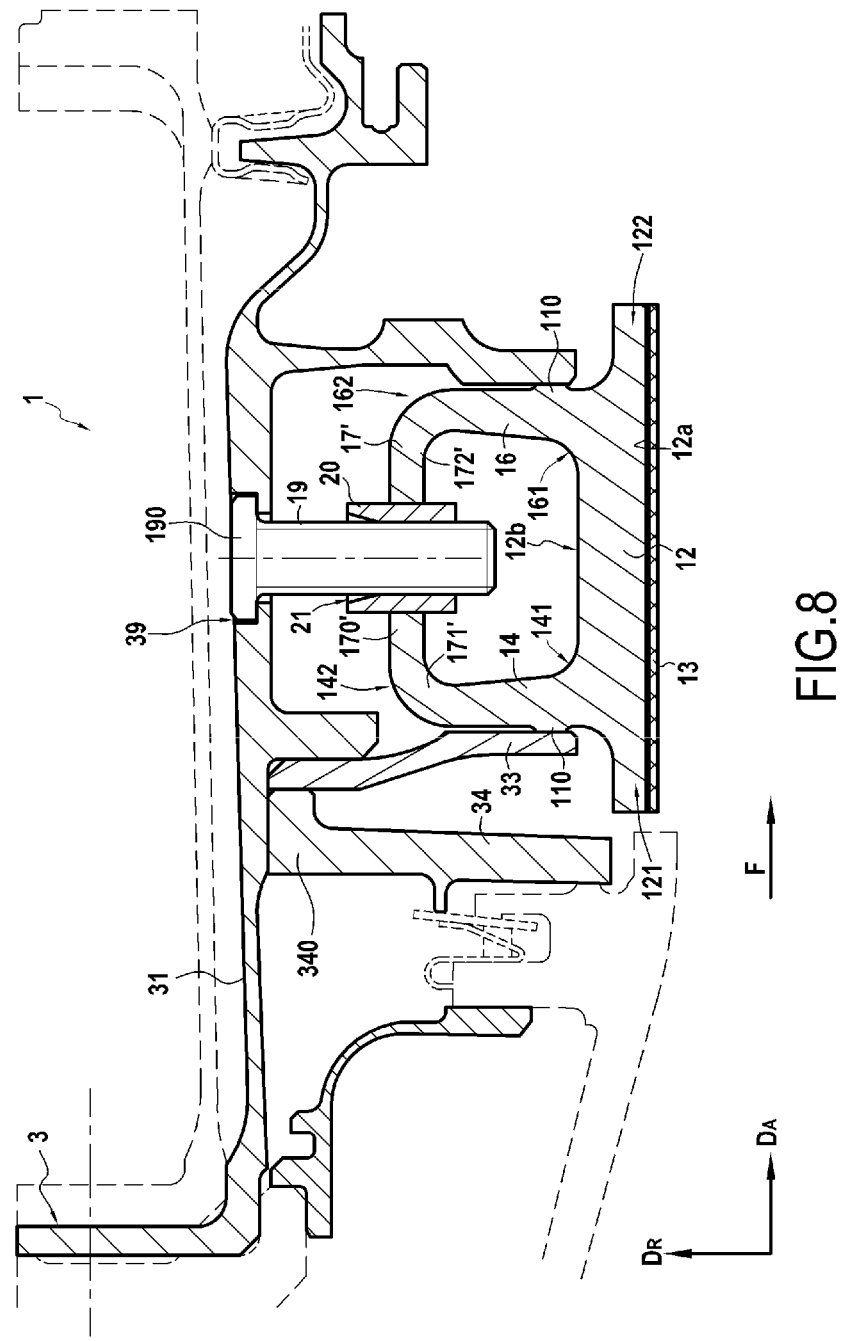
FIG. 8 presents a schematic sectional view of a third embodiment of the turbine ring assembly.

FIG. 8 presents a schematic sectional view of a third embodiment of the turbine ring assembly.

The third embodiment illustrated in FIG. 8 differs from the first embodiment illustrated in FIGS. 2 to 6 in that the ring sector 10 presents in the plane defined by the axial $D_A$ and radial $D_R$ directions, over part of the ring sector 10, an O-shaped section instead of a section in the shape of an inverted π, the ring section 10 being fixed to the ring support structure 3 using a screw 19 and a fixing part 20, the screws 38 being removed.

In the third embodiment illustrated in FIG. 8, the ring sector 10 comprises an axial attachment lug 17' extending between the upstream and downstream attachment radial lugs 14 and 16. The axial attachment lug 17' extends more specifically in the axial direction $D_A$, between the second end 142 of the upstream radial attachment lug 14 and the second end 162 of the downstream radial attachment lug 16.

The axial attachment lug 17' comprises an upstream end 171' and a downstream end 172' separated by a central portion 170'. The upstream and downstream ends 171' and 172' of the axial attachment lug 17' protrude, in the radial direction $D_R$, from the second end 142, 162 of the radial attachment lug 14, 16 to which they are coupled, so as to have a central portion 170' of the axial attachment lug 17' raised relative to the second ends 142 and 162 of the upstream and downstream radial attachment lugs 14 and 16.

For each ring sector 10, the turbine ring assembly comprises a screw 19 and a fixing part 20. The fixing part 20 is fixed to the axial attachment lug 17'.

The fixing part 20 further comprises an orifice 21 equipped with a tapping cooperating with a thread of the screw 19 to fix the fixing part 20 to the screw 19. The screw 19 comprises a screw head 190 whose diameter is greater than the diameter of an orifice 39 made in the central shroud 31 of the support structure of the ring 3 through which the screw 19 is inserted before being screwed to the fixing part 20.

The ring sector 10 is radially secured to the ring support structure 3 using the screw 19, whose head 190 bears on the central crown 31 of the ring support structure 3, and of the fixing part 20 screwed to the screw 19 and fixed to the axial attachment lug 17' of the ring sector 10, the screw head 190 and the fixing part 20 exerting opposite direction forces to hold together the ring 1 and the ring support structure 3.

In one variant, the radial holding of the ring downwards can be ensured by means of four radial pins pressed on the axial attachment lug 17', and the radial holding of the ring upwards can be ensured by means of a pick head, secured to the screw 19, placed under the ring in the cavity between the axial attachment lug 17' and the outer face 12b of the annular base.

In the second and third embodiments illustrated in FIGS. 7 and 8, the second end 342 of the second annular flange 34 comprises a contact stop 340 protruding in the axial direction $D_A$ between the second annular flange 34 and the first flange annular 33. The contact stop 340 allows maintaining a distance between the first end 331 of the first annular flange 33 and the first end 341 of the second annular flange 34 during the tilting of the second annular flange 34 induced by the HPD force.

A method for making a turbine ring assembly will now be described, corresponding to the one represented in FIG. 1, that is to say according to the first embodiment illustrated in FIGS. 2 to 6.

Each ring sector 10 described above is made of ceramic matrix composite (CMC) material by formation of a fibrous preform having a shape close to that of the ring sector and densification of the ring sector by a ceramic matrix.

For making the fibrous preform, it is possible to use ceramic fiber yarns or carbon fiber yarns.

The fibrous preform is advantageously made by three-dimensional weaving, or multilayer weaving with the arrangement of non-interlinked areas making it possible to space apart the portions of preforms corresponding to the attachment lugs 14 and 16 of the sectors 10.

The weaving can be of the interlock type, as illustrated. Other three-dimensional or multi-layer weaves can be used, such as for example multi-canvas or multi-satin weaves. Reference can be made to document WO 2006/136755.

After weaving, the blank can be shaped to obtain a ring sector preform which is consolidated and densified by a ceramic matrix, densification being able to be achieved in particular by chemical vapour infiltration (CVI) which is well known per se. In one variant, the textile preform can be a little cured by CVI so that it is rigid enough to be manipulated, before pulling up liquid silicon by capillarity in the textile for carrying out the densification ("Melt Infiltration").

A detailed example of manufacture of CMC ring sectors is described in particular in document US 2012/0027572.

The ring support structure 3 is made for its part of metal material such as a nickel, cobalt or titanium based alloy.

Making the turbine ring assembly continues by mounting the ring sectors 10 on the ring support structure 3.

For this, the ring sectors 10 are assembled together on an annular "spider"-type tool including, for example, suckers each configured to hold a ring sector 10.

Then the two second pins 120 are inserted into the two orifices 3650 provided in the third portion 365 of the second annular radial clamp 36 of the ring support structure 3.

The ring 1 is then mounted on the ring support structure 3 by inserting each second pin 120 into each of the orifices 180 of the second ears 18 of the downstream radial attachment clamps 16 of each ring sector 10 making up the ring 1.

Then all the first pins 119 are placed in the orifices 170 provided in the first ears 17 of the radial attachment lug 14 of the ring 1.

Then, the first annular flange 33 is positioned by placing the second portion 334 of the first annular flange 33 bearing against the first radial clamp and the rectilinear bearings 110 of the first portion 333 of the first annular flange 33 bearing against the first attachment lug 14 by adjusting the first annular flange 33 so that the first pins 119 are inserted into the orifices 3330 of the first portion 333 of the first annular flange 33.

The second annular flange 34 is then positioned against the first annular flange 33, then, to fix the two upstream flanges 33 and 34 together to the ring support structure 3, screws 60 are inserted into the coaxial orifices 3440, 3340 and 320, provided in the second portion 344 of the second upstream flange 34, in the second portion 334 of the first flange and in the upstream annular radial clamp 32 and each of the screws 60 is tightened using a nut 61.

The ring 1 is thus held in position axially using the first annular flange 33 and the second annular radial clamp 36 bearing respectively upstream and downstream on their respective rectilinear bearing surfaces 110. Upon installation of the first annular flange 33, an axial pre-stress can be applied to the first annular flange 33 and to the upstream radial attachment lug 14 to overcome the effect of differential expansion between the CMC material of the ring 1 and the metal of the ring support structure 3. The first annular flange 33 is held in axial stress by mechanical elements placed upstream as illustrated in dotted lines in FIG. 3.

The ring 1 is held in position radially using the first and second pins 119 and 120 cooperating with the first and second ears 17 and 18 and the orifices 3340 and 3650 of the first annular flange 33 and of the annular radial clamp 36.

The invention thus provides a turbine ring assembly allowing the holding of each ring sector in a deterministic manner while allowing, on the one hand, the ring sector, and by extension the ring, to deform under the effects of temperature rises and pressure variations, and this in particular independently of the metal parts at the interface and, on the other hand, while improving the sealing between the non-flowpath sector and the flowpath sector, in particular the sealing of the cavity located at the radially upper portion of the ring. All this by simplifying the handling and by reducing their number for the mounting the ring assembly.

The invention further provides a turbine ring assembly equipped with an upstream flange making it possible, on the one hand, to ensure optimal sealing of the cavity defined by the ring and, on the other hand, to efficiently accommodate the different axial lengths of each CMC ring sector that makes up the ring crown. In other words, for this second point, the rectilinear contact between the upstream portion of the ring and the lug of the upstream flange must be effective for each ring sector, although these have different widths, these widths being indeed affected by the manufacturing tolerances.

The invention claimed is:

1. A turbine ring assembly comprising a plurality of ring sectors made of ceramic matrix composite material forming a turbine ring and a ring support structure, each ring sector having, along a cutting plane defined by an axial direction and a radial direction of the turbine ring, a portion forming an annular base with, in the radial direction of the turbine ring, a radially inner face defining the inner face of the turbine ring and a radially outer face from which a first and a second attachment lug protrude, the ring support structure including a central shroud from which protrude a first and a second radial clamp from which the first and second attachment lugs of each ring sector are held, the turbine ring assembly further comprising a first annular flange disposed upstream of the turbine ring and of the first radial clamp relative to the direction of an air stream intended to pass through the turbine ring assembly and having in the radial direction a first free end, a second end opposite to the first end, a first portion extending from the first end, and a second portion extending between the first portion and the second end, the first portion of the first flange bearing against the first attachment lug, the second portion of the first flange being fixed to the first radial clamp of the central shroud of the ring support structure, and wherein the first portion of the first annular flange comprising a plurality of radial slits which lead to the first end of the first annular flange and which delimit first-portion sectors of the first annular flange, the radial slits passing through the axial direction, the first annular flange comprising, for each radial slit, a discharge orifice, and each radial slit leads, on the one hand, to the first end of the first annular flange and, on the other hand, into the discharge orifice.

2. The assembly according to claim 1, wherein the discharge orifices are circular orifices having a diameter comprised between 0.5 mm and 8 mm.

3. The assembly according to claim 1, further comprising an inter-sector seal for each radial slit of the first annular flange, each radial slit having a first and a second surface parallel to each other in the radial direction and in the axial direction, the first surface comprising a first groove and the second surface comprising a second groove extending symmetrically to the first groove relative to a plane extending in the axial direction and in the radial direction along the radial slit, a first portion of the inter-sector seal being inserted in the first groove and a second portion of the inter-sector seal being inserted in the second groove.

4. The assembly according to claim 1, further comprising a second annular flange disposed upstream of the first annular flange relative to the direction of the air stream intended to pass through the turbine ring assembly and having a first free end and a second end opposite to the first end, the first end of the second annular flange being distant from the first end of the first annular flange in the axial direction, the second ends of the first and second annular flanges being removably fixed to the first radial clamp of the central shroud of the ring support structure.

5. The assembly according to claim 4, wherein the first flange has a thickness in the axial direction smaller than the thickness in the axial direction of the second flange.

6. The assembly according to claim 4, wherein the second radial clamp of the ring support structure has a first free end and a second end secured to the central shroud of the ring support structure, the first end of the second radial clamp being in contact with the second attachment lug of the turbine ring and having a thickness in the axial direction greater than the thickness of the first end of the first annular flange.

7. The assembly according to claim 1, wherein the ring sector has a section in $\pi$ according to the cutting plane defined by the axial direction and the radial direction, and the assembly comprises, for each ring sector, at least three pins for radially holding the ring sector in position, the first and second attachment lugs of each ring sector each comprising a first end secured to the outer face of the annular base, a second free end, at least three ears for receiving said at least three pins, at least two ears protruding from the second end of one of the first or second attachment lugs in the radial direction of the turbine ring and at least one ear protruding from the second end of the other attachment lug in the radial direction of the turbine ring, each receiving ear including an orifice for receiving one of the pins.

8. The assembly according to claim 1, wherein the ring sector has a K-section along the cutting plane defined by the axial direction and the radial direction, the first and second attachment lugs having an S shape.

9. The assembly according to claim 1, wherein the ring sector has an O-section along the cutting plane defined by the axial direction and the radial direction, the first and second attachment lugs each having a first end secured to the outer face and a second free end, and each ring sector comprising a third and a fourth attachment lug each extending, in the axial direction of the turbine ring, between a second end of the first attachment lug and a second end of the second attachment lug, each ring sector being fixed to the ring support structure by a fixing screw including a screw head bearing against the ring support structure and a thread cooperating with a tapping made in a fixing plate, the fixing plate cooperating with the third and fourth attachment lugs.

10. A turbomachine comprising a turbine ring assembly according to claim 1.

11. The assembly according to claim 2, wherein the circular orifices have a diameter comprised between 1 mm and 5 mm.

* * * * *